Jan. 16, 1962 — O. R. KLEIN — 3,017,193
ANIMAL SIMULATING BICYCLE
Filed June 3, 1958 — 2 Sheets-Sheet 1

INVENTOR.
Oscar R. Klein
BY Victor J. Evans & Co.
ATTORNEYS

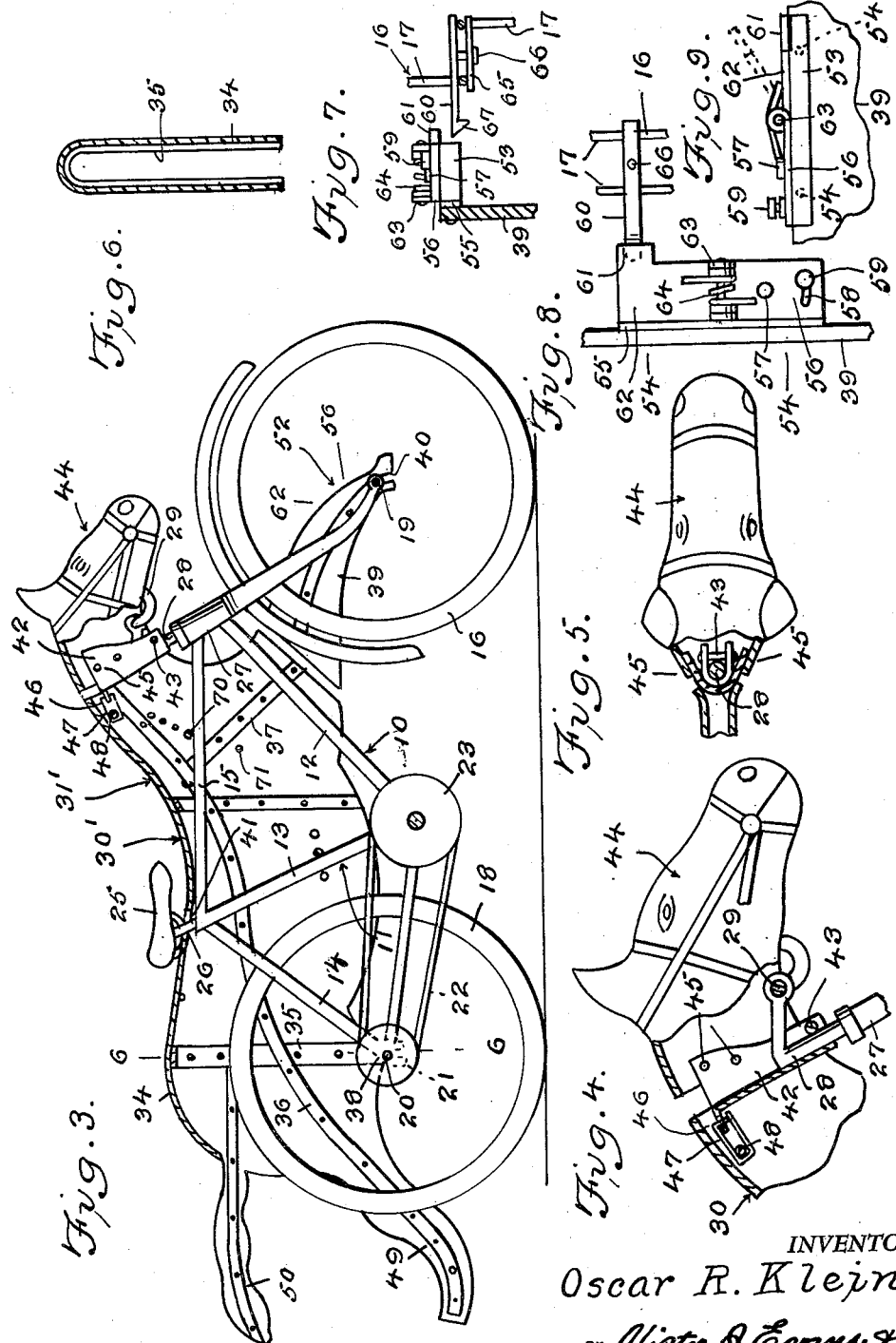

United States Patent Office 3,017,193
Patented Jan. 16, 1962

3,017,193
ANIMAL SIMULATING BICYCLE
Oscar R. Klein, 740 Custer St., Salina, Kans.
Filed June 3, 1958, Ser. No. 739,604
6 Claims. (Cl. 280—1.14)

This invention relates to a bicycle, and more particlarly to an animal simulating mechanism for attachment to a bicycle.

The object of the invention is to provide a means for converting an ordinary bicycle into a device which simulates an animal such as a horse, so that a child using the device will derive increased pleasure or amusement therefrom.

Another object of the invention is to provide a means for converting a conventional bicycle into a device that resembles or simulates an animal such as a horse, and wherein there is provided a means for providing sounds as the bicycle travels so that the sounds will resemble the sounds produced by a horse's hoofs as the horse moves along an area.

A further object of the invention is to provide an animal simulating bicycle which is extremely simple and inexpensive to manufacture.

Other objects and advantages will be apparent during the course of the following description.

In the accompanying drawings, forming a part of this application, and in which like numerals are used to designate like parts throughout the same, FIGURE 1 is a side elevational view illustrating the animal simulating bicycle of the present invention.

FIGURE 3 is a side elevational view similar to FIGURE 1 but illustrating a modification wherein the body member is made of a suitable material that has reinforcing braces therein whereas in FIGURE 1 the member can be made of a somewhat rigid material such as a suitable metal.

FIGURE 4 is a fragmentary front elevational view illustrating the connection between the head member and the body portion and the handle bars.

FIGURE 5 is a fragmentary plan view, with parts broken away and in section, showing the apparatus of FIGURE 4.

FIGURE 6 is a sectional view taken on the line 6—6 of FIGURE 3.

FIGURE 7 is a fragmentary sectional view illustrating the sounding mechanism.

FIGURE 8 is a fragmentary plan view of the assembly shown in FIGURE 7.

FIGURE 9 is a view taken at right angles to the view shown in FIGURE 8.

Figures 1, 2:
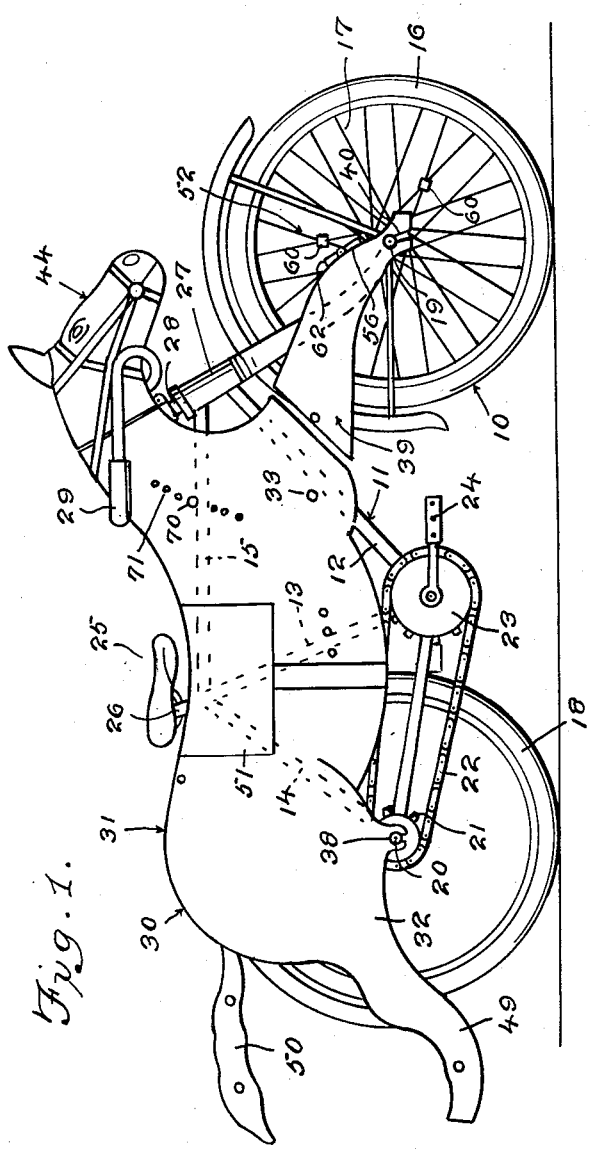
FIGURE 2 is a top plan view of the assembly of FIGURE 1.

Referring in detail to the drawings, the numeral 10 indicates a conventional bicycle which includes the usual frame 11, and the frame 11 embodies bars 12, 13, 14 and 15. The bicycle 10 further includes the usual front wheel 16 which is provided with spokes 17, and the bicycle also includes a rear wheel 18. The numerals 19 and 20 indicate front and rear axles or shafts respectively, and a sprocket 21 is mounted on the rear axle 20, there being an endless chain 22 trained over the sprocket 21. The endless chain 22 is also trained over the usual larger sprocket 23 which is adapted to be rotated by means of the foot pedals 24. The bicycle is further provided with the usual seat 25 which is supported on a stem or element 26. The bicycle also includes a front fork 27 which has a shank 28 connected thereto, and handle bars 29 are connected to the shank 28.

There is further provided an animal simulating member which is indicated generally by the numeral 30, FIGURES 1 and 2, and in these figures the animal simulating member 30 includes a body portion 31 that comprises a pair of similar sections 32 that may be connected together as for example by means of securing elements 33. The sections 32 are adapted to be made of a rigid material such as a suitable metal such as aluminum, but it is to be understood that any suitable material can be used.

In FIGURE 3 there is illustrated a slight modification wherein the numeral 30' indicates an animal simulating member which includes a body portion 31 that can be made of a suitable material such as a lightweight plastic, fabric or the like, and the layer of material which is indicated by the numeral 34 is adapted to have reinforcing braces therein such as the braces 35, 36 and 37, and these braces serve to maintain the material 34 in its proper position or shape.

The lower rear portion of the member 30 is provided with slots 38 for engaging with the rear axle 20, and the member shown in FIGURE 3 may be provided with similar slots. There is further provided a front leg assembly which is indicated generally by the numeral 39, and the front leg assembly 39 is separate from the main body portion 31 so that as the front wheel 16 is turned by the handle bars 29, the front leg assembly 39 will be free to move. The front leg assembly 39 is provided with slots 40 for registering with or receiving the front axle 19.

As shown in FIGURE 3 for example, the upper section of the body portion is provided with an opening or cutout 41 through which extends the stem 26 that supports the usual seat 25.

The numeral 42 indicates a base piece which is connected to the shank 28 in any suitable manner, as for example by means of a securing element 43, FIGURES 4 and 5. The numeral 44 indicates a movable head member which is arranged at the upper front of the body portion, and the head member 44 is connected to the base piece 42 by means of securing elements 45. A finger 46 extends rearwardly from the upper portion of the base piece 42, and the finger 46 is swivelly or pivotally connected to a stationary bracket 47 which is secured to the body portion in any suitable manner, as for example by means of a securing element 48. This construction permits the head 44 to move as the handle bars 29 are manually turned so as to add to the realism afforded by the device.

As shown in FIGURE 1 for example, the device is further provided with rear legs 49, a tail assembly 50, and a saddle 51 may be painted or otherwise formed on the body portion 31.

There is further provided a sound producing mechanism which is indicated generally by the numeral 52, and the sound producing mechanism 52 is connected to the front wheel 16 and front leg assembly 39. This sound producing mechanism comprises a block 53 which is secured to the front leg assembly 39 as for example by means of securing elements 54. A protective strip 55 is interposed or positioned between the block 53 and the adjacent portion of the leg assembly 39. The numeral 56 indicates a first plate which is arranged contiguous to the block 53, and a pin 57 pivotally connects the plate 56 to the block 53. The plate 56 is also provided with a slot 58 through which extends a pin or securing element 59. This construction permits the sounding assembly including the plate 56 to be pivoted to an out-of-the-way position when it is not being used. Thus, by loosening the pin or bolt 59, the plate 56 can be pivoted on the pin 57 so that a lug 61 on a second plate 62 can move out of the path of the sounding finger 60. The second plate 62 is hingedly or pivotally connected to the first plate 56 by means of a pivot pin 63, and a coil spring 64 is provided for normally maintaining or urging the plate 52 into the position shown in FIGURE 8 for example. Thus, it will be seen that with the finger 60 fastened to the spokes 17 of the front wheel 16, as the front wheel 16 rotates or turns, the finger 60 will travel around and engage the lug 61 so as to raise or pivot the plate 62 on the pivot pin 63 and then when the finger 60 flexes past the lug 61, the spring 64 will quickly snap or return the plate 62 to the position shown in FIGURES 7 and 8 so that this plate 62 will bang against the block 53 to produce the sound effect desired. As shown in FIGURE 1, two of the fingers 60 are clamped to the spokes 17 in a predetermined position so that two quick sounds in succession will be provided or produced which will closely resemble or simulate the sound produced by a horse's hoofs as a horse usually travels along a road or the like. Each of the pair of fingers 60 are adapted to be fastened to the spokes 17 by means of a clamp 65 and bolt or securing element 66.

From the foregoing, it is apparent that there has been provided an animal simulating member for use with or attachment to a conventional bicycle such as the bicycle 10. As shown in FIGURES 1 and 2 the assembly is connected to the bicycle 10, and the front legs 39 are separate from the body portion 31. The front legs 39 have the slots 40 which engage the front axle 19, and the front legs 39 are arranged to be positioned on opposite sides of the front wheel 16. Furthermore, the body portion 31 has the slots 38 which receive or engage the rear axle 20, and the seat supporting element 26 extends through the opening 41 in the body portion. The head 44 is movably mounted and it will be seen that there will be no interference with normal riding of the bicycle. Thus, with a child on the seat 25, the feet can readily engage the pedals 24 and the child can then grip the handle bars 29. The body portion is adapted to be colored or provided with suitable designs such as a saddle 51 and tail 50 and rear legs 49 so that the device will closely resemble an animal such as a horse. The head 44 is adapted to be painted or otherwise formed in such a manner as to closely resemble the head of a live horse.

When the child is using the device it will be seen that rotation of the pedals 24 will drive the rear wheel 18 in the usual manner and when the child or other person desires to steer the bicycle, the handle bars 29 are turned so as to move or turn the fork 27 in the usual manner. As the fork 27 turns, the shank 28 turns in the usual manner and this causes movement of the base piece 42 which in turn moves the head 44 in a corresponding manner since the head 44 is connected to the base piece 42 as at 45. Similarly, as the front wheel 16 turns, the front legs 39 move since the front legs are separate from the main body portion. The body portion 31 shown in FIGURES 1 and 2 may be made of a rigid material such as aluminum, whereas the body portion shown in FIGURE 3 may be made of a suitable material such as fabric, thin plastic or the like. When such a thin material is used, suitable reinforcing or strengthening ribs or braces such as the braces 35, 36 and 37 may be provided, and these braces may be secured in place to the fabric 34 in any suitable manner.

Furthermore, as the bicycle is moved or driven, the sounding mechanism will be actuated so as to simulate the sound produced by a horse running along a street or the like. Thus, as the front wheel 16 turns, it carries the pair of fingers 60 therearound, and these fingers 60 will move into and out of engagement with the lug 61 on the plate 62 so that the plate 62 will be raised a predetermined distance until the flexiblity of the parts permit the fingers 60 to move past the lug 61 so that the plate 62 can bang or slam against the stationary block 53 so as to produce a desired sound or noise. It is to be noted that these two fingers 60 are spaced apart a predetermined distance so as to simulate a quick duplication or succession of sounds which resemble a horse's hoofs. The spring 64 serves to return the plate 62 to a position against the block 53 when the fingers 60 move clear of the lug 61. The strip 55 serves to provide a resilient mounting for the block 53 on the leg assembly 39.

The parts can be made of any suitable material and in different shapes or sizes. The clips or fingers 60 may be spaced a predetermined distance apart such as ten inches apart so that two sounds are produced close together and then a pause until the two fingers come around again so that the over-all sound will be like a galloping effect. The device is made so that it closely resembles an animal such as a horse. However, the device may be made to resemble other animals or the like. The head can be pressed or made out of one piece of material or the ears can be made separate and attached to the head. The sounding mechanism makes the device function or operate like a real live horse since it sounds exactly like a horse galloping. When the handle bars or front wheel turns, the head turns and this also adds to the realism.

Thus, it will be seen that there has been provided a horse-like member which can be attached to a bicycle and wherein the device can be readily applied or removed from the bicycle as desired. With the device mounted on a bicycle there will be no interference with normal operation of the bicycle and whenever the handle bars turn, the head turns. The device is constructed so that there will be no weight of the rider on the horse since the regular seat 25 is not disturbed. As examples of materials that can be used in making the device, the following is given: tin, aluminum, wood, plastic, oilcloth, cardboard, felt paper covered with water resistant paint or the like. The parts can be made so that they will fit bicycles of different sizes or shapes. The head may be pressed out of a single piece of suitable material or else it may be made out of several separate pieces of material which can then be attached together. The opening in the head is in the lower portion thereof so that it is not visible when the device is mounted on the bicycle. The bracket 47 may be made of spring steel wire or the like. Suitable slack is provided in the parts such as the parts 46 and 47 and 42 so as to permit turning movement of the head 44. Suitable nuts can be used for retaining or maintaining the parts connected to the front and rear axles.

The sounding mechanism is arranged and constructed so that each time the front wheel goes around, it makes two sounds like the front feet and back feet of a horse hitting the ground or pavement and the faster the wheel goes, the faster the device will produce the sounds or noise like a horse galloping. By loosening the bolt 59, the plate 56 can be pivoted on the pin 57 so that the sounding mechanism can be silent. The block 53 can be fastened to the leg assembly 39 in any suitable manner, as for example by means of the securing elements 54. The strip 55 provides a type of sound installation so as to prevent a ringing or metal sound when the device is actuated. It is to be noted that the fingers 60 are provided with tapered surfaces 67 so that the wheel can be turned backward without interfering with the sounding device since the tapered surface 67 permits the lug 61 to slip by the fingers 60 during such backward movement of the wheel.

The numeral 42 previously described indicates a pedestal or base piece that is secured to the handle bar stem and supports the head 44 that slips down over the pedestal or base piece and is attached thereto by the elements 45. The portion 46 is a part of the base piece 42 and the portion 46 is adapted to be bent back from the base piece 42 and may be provided with a hole or opening therein. The numeral 48 indicates a bolt or pin that passes through the two neck pieces, and the numeral 47 indicates a link or spring steel wire which is constructed so that it can be opened whereby it can be passed around the element 48 between the neck pieces and then passed through the hole in the element 46 and with the member 47 in closed position, there will be a swivel connection between the member 47 and the member 46. The member 47 may be made of spring steel wire and the purpose of the member 47 is to permit the neck portion to be kept in line with the head portion at all times.

As shown in certain of the views such as FIGURES 1 and 3, there is further provided a bolt or pin 70 which passes through certain of a plurality of holes or openings 71 adjacent the neck portion, and the bolt 70 serves to support the weight of the front portion of the horse since it is just above the top bar 15. The reason for providing the plurality of openings or holes 71 is that some top bars 15 are higher or lower so that the opening 71 will be used just above the top bar of the particular bicycle it is applied to.

Minor changes in shape, size and rearrangement of details coming within the field of invention claimed may be resorted to in actual practice, if desired.

I claim:

1. In a device of the character described, a bicycle including a frame, a front wheel provided with spokes, and a back wheel, front and rear axles connected to said wheels, said bicycle further including a seat supporting stem and a front fork, a shank extending upwardly from said fork, handle bars connected to said shank, an animal simulating member connected to said bicycle and said animal simulating member including a body portion mounted on said frame, there being slots in the lower rear portion of said body portion for engagement with said rear axle, a front leg assembly provided with slots for engagement with said front axle, there being an opening in the upper section of said body portion for the projection therethrough of said seat supporting stem, a base piece connected to said shank, a bracket secured to said body portion, a finger extending rearwardly from the upper portion of said base piece, and said finger being swivelly connected to said bracket, a movable head member spaced slightly forward of said body portion, and said head member being connected to said base piece.

2. The structure as defined in claim 1 and further including a sounding mechanism including a block connected to said front leg assembly and to the front wheel.

3. In a device of the character described, a bicycle including a frame, a front wheel provided with spokes, and a back wheel, front and rear axles connected to said wheels, said bicycle further including a seat supporting stem and a front fork, a shank extending upwardly from said fork, handle bars connected to said shank, an animal simulating member connected to said bicycle and said animal simulating member including a body portion mounted on said frame, there being slots in the lower rear portion of said body portion for engagement with said rear axle, a front leg assembly provided with slots for engagement with said front axle, there being an opening in the upper section of said body portion for the projection therethrough of said seat supporting stem, a base piece connected to said shank, a movable head member spaced slightly forward of said body portion, said head member being connected to said base piece, and a sound producing mechanism connected to said front leg assembly and to said front wheel, said sound producing mechanism including a block connected to said front leg assembly, a first plate arranged contiguous to said block, means pivotally and adjustably connecting said first plate to said block, a spring pressed second plate hingedly connected to said first plate, said second plate being mounted for movement into and out of engagement with said block, a lug extending outwardly from said second plate, and a pair of spaced apart fingers clamped to the spokes of the front wheel, said fingers being mounted for movement into and out of engagement with said lug as said front wheel rotates.

4. In a sounding mechanism for producing a sound resembling the galloping of a horse, said sounding mechanism adapted to be connected to a bicycle wheel and including a block, a first plate arranged contiguous to said block, means pivotally and adjustably connecting said first plate to said block, a spring pressed second plate hingedly connected to said first plate, said second plate being mounted for movement into and out of engagement with said block, a lug extending outwardly from said second plate, and a pair of spaced apart fingers mounted for movement into and out of engagement with said lug.

5. In a device of the character described, a bicycle including a frame, a front wheel provided with spokes, and a back wheel, front and rear axles connected to said wheels, said bicycle further including a seat supporting stem and a front fork, a shank extending upwardly from said fork, handle bars connected to said shank, an animal simulating member connected to said bicycle and said animal simulating member including a body portion mounted on said frame, there being slots in the lower rear portion of said body portion for engagement with said rear axle, a front leg assembly provided with slots for engagement with said front axle, there being an opening in the upper section of said body portion for the projection therethrough of said seat supporting stem, a base piece connected to said shank, a movable head member spaced slightly forward of said body portion, said head member being connected to said base piece, and a sound producing mechanism connected to said front leg assembly and to said front wheel, said sound producing mechanism including a block connected to said front leg assembly, a first plate arranged contiguous to said block, means pivotally and adjustably connecting said first plate to said block, a spring pressed second plate hingedly connected to said first plate, said second plate being mounted for movement into and out of engagement with said block, a lug extending outwardly from said second plate, and a pair of spaced apart fingers clamped to the spokes of the front wheel, said fingers being mounted for movement into and out of engagement with said lug as said front wheel rotates, said bicycle frame further including a substantially horizontally disposed bar, said animal simulating member further including a neck portion provided with a plurality of spaced apart openings, and a pin extending through certain of said last named openings and arranged just above the last named bar.

6. In a bicycle of the type including a frame, front and back wheels, front and rear axles connected to said wheels, a seat supporting stem and a front fork, a shank extending upwardly from said fork, handle members connected to said shank, said bicycle frame further including a substantially horizontally disposed bar, the improvement consisting in providing an animal simulating member connected to said bicycle and said animal simulating member including a body portion mounted on said frame, there being slots in the lower rear portion of said body portion for engagement with said rear axle, a front leg assembly provided with slots for engagement with said front axle, there being an opening in the upper section of said body portion for the projection therethrough of said seat supporting stem, a base piece connected to said shank, a bracket secured to said body portion, a finger extending rearwardly from the upper portion of said base piece, and said finger being swivelly connected to said bracket, a movable head member spaced slightly forward of said body portion, said head member being connected to said base piece, said animal simulating member further including a neck portion provided with a plurality of spaced apart openings, and a pin extending through certain of said last named openings and arranged just above the substantially horizontally disposed bar of the bicycle frame.

References Cited in the file of this patent

UNITED STATES PATENTS

| | | |
|---|---|---|
| 2,044,889 | Ralston | June 23, 1936 |
| 2,219,627 | Kiefel | Oct. 29, 1940 |
| 2,578,682 | Fernstrom | Dec. 18, 1951 |
| 2,591,804 | Gonda | Apr. 8, 1952 |
| 2,643,133 | Lucchesi | June 23, 1953 |
| 2,646,990 | Fowler | July 28, 1953 |
| 2,736,136 | Modlin | Feb. 28, 1956 |
| 2,898,121 | Kelly | Aug. 4, 1959 |